(12) United States Patent
Sun et al.

(10) Patent No.: US 11,466,155 B2
(45) Date of Patent: Oct. 11, 2022

(54) FILLING COMPOSITION FOR OPTICAL FIBER CABLES

(71) Applicant: Dow Global Technologies LLC, Midland, MI (US)

(72) Inventors: Gangwei Sun, Shanghai (CN); XianMin Xu, Shanghai (CN); Mohamed Esseghir, Lawrenceville, NJ (US); Peng Gao, Shanghai (CN); Youjun Wu, Shanghai (CN); Lingfeng Yu, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 407 days.

(21) Appl. No.: 16/624,556

(22) PCT Filed: Jun. 30, 2017

(86) PCT No.: PCT/CN2017/090993
§ 371 (c)(1),
(2) Date: Dec. 19, 2019

(87) PCT Pub. No.: WO2019/000360
PCT Pub. Date: Jan. 3, 2019

(65) Prior Publication Data
US 2021/0155802 A1    May 27, 2021

(51) Int. Cl.
*C08L 91/00* (2006.01)
*C08L 53/02* (2006.01)
*G02B 6/44* (2006.01)

(52) U.S. Cl.
CPC .............. *C08L 91/00* (2013.01); *C08L 53/025* (2013.01); *G02B 6/4429* (2013.01); *G02B 6/4494* (2013.01); *C08L 2207/322* (2013.01)

(58) Field of Classification Search
CPC ........... C08L 2207/332; C08L 23/0815; C08L 2205/025; C08L 2205/03; C08L 53/00;
(Continued)

(56) References Cited

U.S. PATENT DOCUMENTS

| | | | |
|---|---|---|---|
| 3,830,953 A * | 8/1974 | Wood | H01B 7/285 156/48 |
| 4,506,056 A * | 3/1985 | Gaylord | C08F 291/00 525/260 |

(Continued)

FOREIGN PATENT DOCUMENTS

| | | | |
|---|---|---|---|
| CA | 2543705 | 5/2005 | |
| CA | 2980728 A1 * | 10/2016 | .......... C08L 23/0815 |

(Continued)

OTHER PUBLICATIONS

Office Action from corresponding Japanese 2019-570021 application, dated Jun. 17, 2021.
(Continued)

*Primary Examiner* — Lee E Sanderson

(57) ABSTRACT

A filling composition comprises (A) a mineral oil having a kinematic viscosity from 80 cSt to 100 cSt at 40° C.; (B) a styrene-ethylene/propylene diblock copolymer; and (C1) a propylene/ethylene copolymer having a weight average molecular weight ($M_w$) from 5,000 to 200,000 or (C2) an ethylene/propylene copolymer having a weight average molecular weight ($M_w$) from 5,000 to 200,000. The filling composition is used as a filling composition in a buffer tube.

9 Claims, 1 Drawing Sheet

(58) Field of Classification Search
CPC ... C08L 53/025; C08L 2203/202; G02B 6/00; G02B 6/44; G02B 6/4401; G02B 6/4429; G02B 6/4433; G02B 6/4494; H01B 3/18; H01B 3/44; H01B 3/442
USPC .................................. 428/36.9, 36.91, 36.92
See application file for complete search history.

(56) References Cited

U.S. PATENT DOCUMENTS

| | | | |
|---|---|---|---|
| 4,701,016 A * | 10/1987 | Gartside, III | G02B 6/4401 |
| | | | 385/100 |
| 4,844,575 A * | 7/1989 | Kinard | G02B 6/4434 |
| | | | 385/113 |
| 5,187,763 A | 2/1993 | Tu et al. | |
| 5,574,257 A * | 11/1996 | Brauer | C10M 143/04 |
| | | | 174/76 |
| 5,728,754 A | 3/1998 | Lakshmanan et al. | |
| 5,737,469 A * | 4/1998 | Costello | C10M 143/10 |
| | | | 523/173 |
| 5,783,638 A | 7/1998 | Lai et al. | |
| 6,160,939 A | 12/2000 | Sheu | |
| 6,278,824 B1 * | 8/2001 | Bosisio | G02B 6/4494 |
| | | | 385/100 |
| 6,723,686 B2 | 4/2004 | Calle et al. | |
| 7,247,796 B2 | 7/2007 | Hagen et al. | |
| 9,075,212 B2 | 7/2015 | McAlpine et al. | |
| 10,178,369 B2 | 1/2019 | Yu et al. | |
| 2007/0021561 A1 * | 1/2007 | Tse | C08L 23/10 |
| | | | 525/88 |
| 2015/0219796 A1 | 8/2015 | Salazar | |

FOREIGN PATENT DOCUMENTS

| | | | |
|---|---|---|---|
| CN | 1926642 | 3/2007 | |
| CN | 101876735 | 11/2010 | |
| CN | 102827482 | 12/2012 | |
| CN | 104583380 | 4/2015 | |
| EP | 1031861 B1 | 7/2006 | |
| JP | 60049308 | 3/1985 | |
| JP | 5157952 | 6/1993 | |
| JP | 10067913 | 6/1993 | |
| JP | 9105844 | 4/1997 | |
| JP | 11174290 | 7/1999 | |
| JP | 2000056194 | 2/2000 | |
| JP | 2016532137 | 10/2016 | |
| WO | WO-2015054896 A1 * | 4/2015 | C08L 23/12 |
| WO | 2016115849 | 7/2016 | |
| WO | 2017100175 | 6/2017 | |

OTHER PUBLICATIONS

Williams, T., et al., "The Construction of a Polyethylene Calibration Curve for Gel Permeation Chromatography Using Polystyrene Fractions," Polymer Letters, 1968, p. 621-624, vol. 6.
PCT Search Report from PCT counterpart Application No. PCT/CN2017/090993.

* cited by examiner

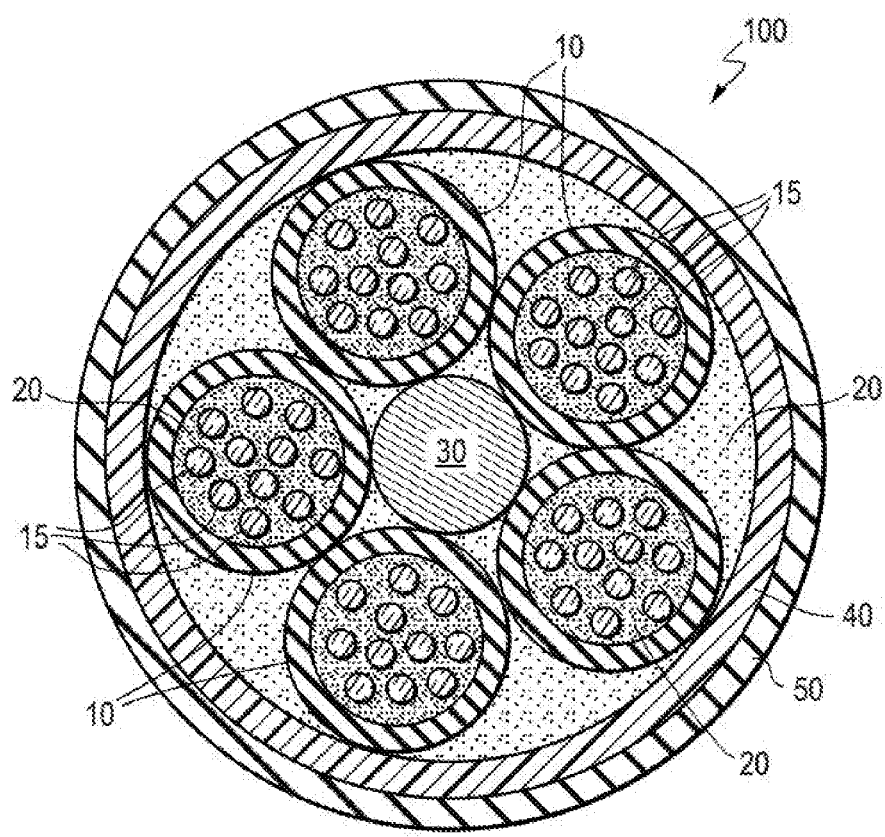

FILLING COMPOSITION FOR OPTICAL FIBER CABLES

FIELD

This disclosure relates to optical fiber cables. In one aspect, the disclosure relates to filling compositions for optical fiber cables, while in another aspect, the disclosure relates to optical fiber cables including the same.

BACKGROUND

Optical fiber cables include one or more optical fibers or other optical waveguides that conduct optical signals (e.g., for carrying sound, data, video or other information). Generally, the optical fibers are arranged in a tubular assembly called a buffer tube. To protect the optical fibers from damage (e.g., exposure to humidity/moisture, physical stress), the buffer tube is filled with a filling composition which surrounds the optical fibers. The filling composition acts as a moisture barrier to prevent water from damaging the optical fibers and a cushion to absorb mechanical shock. The filing composition can be a fluid, a gel, a grease or a thixotropic material.

Buffer tubes are traditionally made of polybutylene terephthalate (PBT) and filling compositions for use with PBT buffer tubes are commonly based on a composition composed of styrenic block copolymer and a large proportion of a hydrocarbon oil (e.g., mineral oil). Such a filling composition is a fluid which flows easily around the optical fibers to completely fill the buffer tube and can be readily pumped into the buffer tube during manufacture of an optical fiber cable. One drawback of such a fluid filling composition, however, is that when the optical fiber cables are cut, the filling composition flows from the cut end which can make installation of the optical fiber cables difficult. Dry gels are easier for operators to work with, in that a cut optical fiber cable having a dry gel for a filling composition does not drip or flow when the optical fiber cable is cut. However, dry gels are difficult to pump and do not flow as readily as fluids.

Buffer tubes can also be made from a polyolefin material. It is problematic that mineral oil-based filling compositions, such as those used with PBT buffer tubes, have low compatibility with the polyolefin buffer tube material. The mineral oil migrates into the polyolefin material, resulting in loss of mechanical performance for the buffer tube.

Consequently, the art recognizes the need for a filling composition which flows (i.e., can be pumped) and reduces or avoids the difficulties associated with oil leakage and cleanup. The art further recognizes the need for a filling composition that is compatible with fiber optic cable materials, including the material of the buffer tube.

SUMMARY

The present disclosure provides a filling composition comprising (A) a mineral oil having a kinematic viscosity from 80 cSt to 100 cSt at 40° C.; (B) a styrene-ethylene/propylene diblock copolymer; and (C) a propylene/ethylene copolymer having a weight average molecular weight ($M_w$) from 5,000 to 200,000.

In another embodiment, the present disclosure provides a filling composition comprising (A) a mineral oil having a kinematic viscosity from 80 cSt to 100 cSt at 40°; (B) a styrene-ethylene/propylene diblock copolymer; and (C) an ethylene/propylene copolymer having a weight average molecular weight ($M_w$) from 5,000 to 200,000.

In another embodiment, the present disclosure provides a buffer tube comprising a filling composition in contact with a surface of the buffer tube, the composition comprising (A) a mineral oil having a kinematic viscosity from 80 cSt to 100 cSt at 40° C.; (B) a styrene-ethylene/propylene diblock copolymer; and (C) a propylene/ethylene copolymer having a weight average molecular weight ($M_w$) from 5,000 to 200,000.

BRIEF DESCRIPTION OF THE DRAWINGS

FIG. 1 is a cross-sectional view of an optical fiber cable.

DEFINITIONS AND TEST METHODS

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2, or 3 to 5, or 6, or 7), any subrange between any two explicit values is included (e.g., 1 to 2; 2 to 6; 5 to 7; 3 to 7; 5 to 6; etc.). Unless stated to the contrary, implicit from the context, or customary in the art, all parts and percents are based on weight and all test methods are current as of the filing date of this disclosure.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method used to measure and/or identify domain configurations. Blends are not laminates, but one or more layers of a laminate may contain a blend.

"Cable" and like terms refer to at least one optical fiber within a protective insulation, jacket or sheath. Typically, a cable is two or more optical fibers bound together, typically in a common protective insulation, jacket or sheath. The individual fibers inside the jacket may be bare, covered or insulated.

"Composition," as used herein, includes a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically listed. The term "or," unless stated otherwise, refers to the listed members individual as well as in any combination. Use of the singular includes use of the plural and vice versa.

Density is measured in accordance with ASTM D1525.

"Direct Contact" means a configuration whereby a surface is immediately adjacent to a filling composition and no intervening layers or no intervening structures are present between the surface and the filling composition.

The drop point is an indication of the maximum temperature to which a filling compound can be exposed to without complete liquefaction or excessive oil separation. The drop point is determined using a ShenKai Drop Point Tester and is reported in ° C. The upper cork of the ShenKai Drop Point Tester is positioned so that the tip of the first thermometer bulb is about 3 mm above the bottom of the cup when the apparatus is assembled for test. The second thermometer is suspended in the oil bath so that its bulb is at approximately the same level as the bulb of the first thermometer. The cup is filled by presenting its larger opening into the filling composition until the cup is filled. The cup is held in a vertical position with its smaller opening at the bottom while it is gently pressed down over the metal rod until the rod protrudes about 25 mm above the larger opening. The rod is pressed against the cup in such a manner that the rod makes contact with both the upper and lower peripheries of the cup. This contact is maintained while the cup is rotated around its axis and is simultaneously moved down the rod until the cup passes over the lower end of the rod. This spiral-like motion will cause the filling composition to adhere along the rod leaving a conical void of compound in the cup and a coating having reproducible geometry on the inside of the cup. The cup and thermometer are placed in the test tube and the test tube is suspended in the oil bath. The oil bath is stirred and heated at a rate of 4 C.°/min to 7 C.°/min until the bath reaches a temperature approximately 17° C. below the expected drop point of the filling composition. Heating is continued at a rate such that the difference between the temperature in the test tube and the temperature in the oil bath is maintained between 1-2° C. This condition is established when the oil bath is heated at a rate of about 1 C.°/min to 1.5 C.°/min. As the temperature increases, the filling composition will gradually protrude through the orifice of the cup. The temperature at which the first drop of material falls is the drop point.

An "ethylene-based polymer" is a polymer that contains more than 50 weight percent polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Non-limiting examples of ethylene-based polymer (polyethylene) include low density polyethylene (LDPE) and linear polyethylene. Non-limiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), single-site catalyzed linear low density polyethylene (m-LLDPE), substantially linear, or linear, plastomers/elastomers, medium density polyethylene (MDPE), and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations.

An "ethylene-based polyolefin material" is a material that contains more than 50 weight percent of an ethylene-based polymer (based on the total weight of the material). Ethylene-based polyolefin materials include pure polyethylene as well as blends of ethylene-based polymers with other polyolefin polymers.

An "optical fiber" is a flexible, transparent fiber made by drawing glass or plastic to a diameter of several hundred microns or less. Typical optical fiber has a diameter from 230 micrometers (μm) to 270 μm, or 250 μm. The diameter of the optical fiber may or may not include a cladding and/or a coating surrounding the optical fiber. Optical fiber is used most often as a way to transmit light between the two ends of the fiber. Optical fiber finds wide usage in fiber-optic communications, where it enables transmission over distances and at data rates greater than wire cables.

A "propylene-based polymer" is a polymer that contains more than 50 weight percent polymerized propylene monomer (based on the total amount of polymerizable monomers) and, optionally, may contain at least one comonomer. Propylene-based polymer includes propylene homopolymer and propylene copolymer (meaning units derived from propylene and one or more comonomers). The terms "propylene-based polymer" and "polypropylene" may be used interchangeably.

A "propylene-based polyolefin material" is a material that contains more than 50 weight percent of a propylene-based polymer (based on the total weight of the material). Ethylene-based polyolefin materials include pure polypropylene as well as blends of propylene-based polymers with other polyolefin polymers.

"Interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

Melt flow rate (MFR) is measured in accordance with ASTM D1238, Condition 230° C./2.16 kilogram (kg) weight and reported in grams per 10 minutes (g/10 min).

Melt index (MI) is measured in accordance with ASTM D1238 at 190° C., 2.16 kg and reported in grams per 10 minutes (g/10 min).

Melt temperature, or "$T_m$" as used herein (also referred to as a melting peak in reference to the shape of the plotted DSC curve) is typically measured by the DSC (Differential Scanning calorimetry) technique for measuring the melting points or peaks of polyolefins, as described in U.S. Pat. No. 5,783,638. It should be noted that many blends comprising two or more polyolefins will have more than one melting point or peak, many individual polyolefins will comprise only one melting point or peak.

Molecular weight is determined using gel permeation chromatography (GPC) on a Waters 150° C. high temperature chromatographic unit equipped with three mixed porosity columns (Polymer Laboratories 103, 104, 105, and 106), operating at a system temperature of 140° C. The solvent is 1,2,4-trichlorobenzene, from which 0.3 percent by weight solutions of the samples are prepared for injection. The flow rate is 1.0 mL/min and the injection size is 100 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by T. Williams & I. M. Ward, *The Construction of a Polyethylene Calibration Curve for Gel Permeation Chromatography Using Polystyrene Fractions*, 6 J. Polymer Sci. Pt. B: Polymer Letter 621, 621-624 (1968)) to derive the following equation:

$$M_{polyethylene} = a \times (M_{polystyrene})^b$$

In this equation, a=0.4316 and b=1.0.

Number average molecular weight, $M_n$, of a polymer is expressed as the first moment of a plot of the number of molecules in each molecular weight range against the molecular weight. In effect, this is the total molecular weight of all molecules divided by the number of molecules and is calculated in the usual matter according to the following formula:

$$M_n = \sum n_i \times \frac{M_i}{\sum n_I} = \frac{\sum w_i}{\sum \left(\frac{w_i}{M_i}\right)}$$

where
$n_i$=number of molecules with molecular weight $M_i$
$w_i$=weight fraction of material having molecular weight $M_i$
and $\Sigma n_i$=total number of molecules.

Weight average molecular weight, $M_w$, is calculated in the usual manner according to the following formula: $M_w = \Sigma w_i \times M_i$, where $w_i$ and $M_i$ are the weight fraction and molecular weight, respectively, of the $i^{th}$ fraction eluting from the GPC column.

The ratio of these two averages, the molecular weight distribution (MWD or $M_w/M_n$), defines the breadth of the molecular weight distribution.

Oil adsorption is determined by injecting the polymeric material into a dumbbell shape having a weight of approximately 1.2 grams. The dumbbell-shaped samples are carefully weighed, immersed in a prepared fluid and stored (immersed in the fluid) at 80° C. for 5 days. After heat storage, the samples are cleaned by paper or cloth and weight carefully. The result of the weight after storage minus the weight before storage is the oil weight absorbed by the dumbbell-shaped samples. 6 replicate samples are tested for each fluid sample. Results are reported in percent.

"Polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as previously defined. Trace amounts of impurities, for example, catalyst residues, may be incorporated into and/or within the polymer.

"Olefin polymer," "olefinic polymer," "olefinic interpolymer," "polyolefin" and like terms refer to a polymer derived from simple olefins. Representative polyolefins include polyethylene, polypropylene, polybutene, polyisoprene and their various interpolymers.

The shear rate is the rate of change of velocity at which one layer of a fluid passes over an adjacent layer. Shear rate is a gradient velocity and depends on flow velocity and radius of the tube/vessel. For fluid flows between two parallel plates, one moving at a constant speed and the other one stationary (Couette flow), the shear rate is calculated by $\dot{\gamma}=v/h$, wherein $\dot{\gamma}$ is the shear rate, measured in reciprocal seconds, v is the velocity of the moving plate, measured in meters per second (m/sec), and h is the distance between the two parallel plates, measured in meters (m). Shear rate is reported in inverse seconds ($s^{-1}$).

The shear thinning index is the ratio of shear viscosities at a low shear rate (e.g., 0.1 $s^{-1}$ to 10 $s^{-1}$) and a high shear rate (e.g., greater than or equal to 100 $sec^{-1}$). The shear thinning index is measured in a steady state shear mode by a rotational rheometer AR2000EX, TA instruments with a 20 mm, 2 degree steel cone plate. The testing temperature is set at 25° C. and the shear rates ranged from 1 $s^{-1}$ to 201 $s^{-1}$. The shear thinning index is calculated using the shear viscosity at 6 $s^{-1}$ and the shear viscosity at 201 $s^{-1}$.

The tensile stress at yield (zero slope), automatic Young's modulus and 1% secant modulus are determined in accordance with ASTM D638 and reported in megapascal (MPa).

Shear viscosity (or dynamic viscosity) is a fluid's resistance to shearing flows and is reported in Pa·s (pascal seconds), mPa·s (millipascal seconds) or MPa·s (megapascal seconds). Shear viscosity is calculated by $\eta=\tau/\dot{\gamma}$ wherein $\eta$ is the shear viscosity measured in Pascal·seconds, $\tau$ is the shear stress measured in Pascal, and $\dot{\gamma}$ is the shear rate, measured in reciprocal seconds. For purposes of this specification, shear viscosity is measured using an AR2000EX rotational rheometer, TA instruments with a 20 mm, 2 degrees steel cone plate. The testing temperature is set at 25° C. and the shear rates ranged from 1 $s^{-1}$ to 201 $s^{-1}$.

Low shear rate viscosity is the shear viscosity measured at a shear rate of 6 $s^{-1}$.

Medium shear rate viscosity is the shear viscosity measured at a shear rate of 51 $s^{-1}$.

High shear rate viscosity means the shear viscosity measured at a shear rate of 201 $s^{-1}$.

Kinematic viscosity is the ratio of the shear viscosity to the density of a fluid and is reported in St (stokes) or cSt (centistokes). For purposes of this specification, kinematic viscosity is measured at 40° C. using a Brookfield viscometer in accordance with ASTM D 445.

DETAILED DESCRIPTION

The present disclosure provides a filling composition comprising (A) a mineral oil having a kinematic viscosity from 80 cSt to 100 cSt at 40° C.; (B) a styrene-ethylene/propylene diblock copolymer; and (C) a propylene/ethylene copolymer having a weight average molecular weight ($M_w$) from 5,000 to 200,000.

In another embodiment, the disclosure provides a filling composition comprising (A) a mineral oil having a kinematic viscosity from 80 cSt to 100 cSt at 40° C.; (B) a styrene-ethylene/propylene diblock copolymer; and (C) an ethylene/propylene copolymer having a weight average molecular weight ($M_w$) from 5,000 to 200,000.

(A) Mineral Oil

The filling composition comprises a mineral oil having a kinematic viscosity from 80 cSt to 100 cSt.

In an embodiment, the mineral oil is free of fillers and rheology modifiers, such as thickeners.

Non-limiting examples of suitable commercially-available mineral oils include 80# mineral oil from Suzhou Saipahan Oil Company (kinematic viscosity=80 cSt at 40° C.) and 100# mineral oil from Sinoreagent Company (viscosity=100 cSt at 40° C.).

In an embodiment, the mineral oil is present in the composition in an amount of from 70 weight percent (wt %), or 75 wt %, or 80 wt % to 85 wt %, or 87 wt %, or 88 wt %, or 89 wt %, or 90 wt % based on the total weight of the filling composition.

(B) Styrene-Ethylene/Propylene Diblock Copolymer

The filling composition comprises a styrene-ethylene/propylene diblock copolymer.

The styrene-ethylene/propylene diblock copolymer has a bound styrene content from 25%, or 30%, or 35% to 40%, or 45% by mass.

The styrene-ethylene/propylene diblock copolymer has a density from 0.890 g/cc, or 0.895 g/cc, or 0.900 g/cc, or 0.905 g/cc to 0.910 g/cc, or 0.915 g/cc, or 0.920 g/cc.

In an embodiment, the styrene-ethylene/propylene diblock copolymer is present in the filling composition to the exclusion of triblock polymers and styrenic triblock polymers in particular.

A non-limiting example of a suitable commercially-available styrene-ethylene/propylene diblock copolymer is G1701, a clear linear diblock copolymer based on styrene and ethylene/propylene, with a bound styrene content of 35% mass, available from Kraton Company.

In an embodiment, the styrene-ethylene/propylene diblock copolymer is a mixture of two or more styrene-ethylene/propylene diblock copolymers as described herein.

In an embodiment, the styrene-ethylene/propylene diblock copolymer or mixture of two or more styrene-ethylene/propylene diblock copolymers is present in the composition in an amount of from 5 wt %, or 6 wt %, or 7 wt %, or 8 wt %, or 9 wt % to 10 wt %, or 11 wt %, or 12 wt %, or 13 wt %, or 14 wt % or 15 wt % based on the total weight of the filling composition.

(C1) Propylene/Ethylene Copolymer

In an embodiment, the filing composition comprises a propylene/ethylene copolymer.

The propylene/ethylene copolymer has a weight average molecular weight ($M_w$) from 5,000, or 10,000, or 20,000 to 50,000, or 100,000, or 150,000, or 200,000.

The propylene/ethylene copolymer has a number average molecular weight ($M_e$) from 5,000, or 10,000, or 20,000, or 50,000 to 60,000, or 75,000, or 100,000.

The propylene/ethylene copolymer has a density from 0.850 g/cc, or 0.855 g/cc, or 0.860 g/cc, or 0.965 g/cc to 0.870 g/cc, or 0.875 g/cc, or 0.880 g/cc, or 0.885 g/cc, or 0.890 g/cc, or 0.895 g/cc, or 0.900 g/cc.

The propylene/ethylene copolymer has an ethylene content from 1 wt %, or 2 wt %, or 3 wt %, or 4 wt %, or 5 wt % to 6 wt %, or 7 wt %, or 8 wt %, or 9 wt %, or 10 wt %, based on the total weight of the propylene/ethylene copolymer.

The propylene/ethylene copolymer has a melt flow rate (MFR) from 5 g/10 min, or 10 g/10 min, or 25 g/10 min, or 50 g/10 min, or 100 g/10 min to 250 g/10 min, or 500 g/10 min, or 750 g/10 min, or 1000 g/10 min.

The propylene/ethylene copolymer has a melt temperature ($T_m$) from 120° C., or 130° C., or 140° C. to 150° C., or 160° C., or 170° C.

In an embodiment, the propylene/ethylene copolymer has one, some or all of the following properties:

i) an ethylene content from 4 wt %, or 4.25 wt %, or 4.5 wt %, or 4.75 wt %, or 5 wt %, or 5.25 wt %, or 5.5 wt %, or 5.75 wt % to 6 wt %, or 6.25 wt %, or 6.5 wt %, or 6.75 wt %, or 7 wt %, or 7.25 wt %, or 7.5 wt %, or 7.75 wt %, or 8 wt %, based on the total weight of the propylene/ethylene copolymer; and/or ii) a density from 0.860 g/cc, or 0.862, or 0.865 g/cc, or 0.867 g/cc, or 0.870 g/cc, or 0.872 g/cc, or 0.875 g/cc, or 0.877 g/cc to 0.880 g/cc, or 0.882 g/cc, or 0.885 g/cc, or 0.887 g/cc, or 0.890 g/cc; and/or iii) a MFR from 20 g/10 min, or 22 g/10 min, or 24 g/10 min, or 25 g/10 min to 27 g/10 min, or 29 g/10 min, or 30 g/10 min, or 32 g/10 min; and/or iv) a weight average molecular weight ($M_w$) from 25,000, or 30,000, or 35,000, or 40,000, or 45,000, or 50,000, or 55,000, or 60,000, or 65,000, to 70,000, or 75,000, or 80,000, or 100,000, or 125,000, or 150,000, or 175,000; and/or v) a melt temperature ($T_m$) from 130° C., or 135° C., or 140° C., or 145° C. to 150° C., or 155° C., or 160° C., or 165° C.

An non-limiting example of a suitable commercially-available propylene/ethylene copolymer is VERSIFY 4301 available from the Dow Chemical Company.

In an embodiment, the propylene/ethylene copolymer is a mixture of two or more propylene/ethylene copolymers as described herein.

In an embodiment, the propylene/ethylene copolymer or mixture of two or more propylene/ethylene copolymers is present in the composition in an amount of from 1 wt %, or 2 wt %, or 3 wt %, or 5 wt % to 7 wt %, or 8 wt %, or 10 wt %, or 15 wt %, or 20 wt % based on the total weight of the filing composition.

(C2) Ethylene/Propylene Copolymer

In an embodiment, the filling composition comprises an ethylene/propylene copolymer.

The ethylene/propylene copolymer has a weight average molecular weight ($M_w$) from 5,000, or 10,000, or 20,000 to 30,000, or 50,000, or 100,000, or 200,000.

The ethylene/propylene copolymer has a number average molecular weight ($M_e$) from 5,000, or 10,000, or 20,000, or 50,000 to 60,000, or 75,000, or 100,000.

The ethylene/propylene copolymer has a density from 0.850 g/cc, or 0.855 g/cc, or 0.860 g/cc, or 0.965 g/cc to 0.870 g/cc, or 0.875 g/cc, or 0.880 g/cc, or 0.885 g/cc, or 0.890 g/cc, or 0.895 g/cc, or 0.900 g/cc.

The ethylene/propylene copolymer has a melt index (MI) from 600 g/10 min, or 650 g/10 min, or 700 g/10 min to 750 g/10 min, or 800 g/10 min at 190° C., 2.16 kg.

The ethylene/propylene copolymer has a propylene content from 5 wt %, or 10 wt %, or 15 wt % to 20 wt %, or 25 wt %, or 30 wt % based on the total weight of the ethylene/propylene copolymer.

The ethylene/propylene copolymer has a melt index (MI) from 600 g/10 min, or 650 g/10 min, or 700 g/10 min to 750 g/10 min, or 800 g/10 min.

The ethylene/propylene copolymer has a melt temperature ($T_m$) from 50° C., or 55° C., or 60° C., or 65° C., or 70° C., or 75° C. to 80° C., or 85° C., or 90° C., or 95° C., or 100° C., or 105° C., or 110° C.

In an embodiment, the ethylene/propylene copolymer has one, some or all of the following properties:

i) a propylene content from 15 wt %, or 16 wt %, or 17 wt %, or 18 wt %, or 19 wt %, or 20 wt % to 21 wt %, or 22 wt %, or 23 wt %, or 24 wt %, or 25 wt %; and/or ii) a density from 0.875 g/cc, or 0.877 g/cc, or 0.880 g/cc, or 0.882 g/cc, or 0.885 g/cc, or 0.887 g/cc, or 0.890 g/cc to 0.892 g/cc, or 0.895 g/cc, or 0.897 g/cc, or 0.900 g/cc; and/or iii) a MI from 650 g/10 min, or 675 g/10 min, or 700 g/10 min to 725 g/10 min, or 750 g/10 min, or 775 g/10 min, or 800 g/10 min; and/or iv) a weight average molecular weight ($M_w$) from 15,000, or 16,000, or 17,000, or 18,000, or 19,000, or 20,000 to 21,000, or 22,000, or 23,000, or 24,000, or 25,000; and/or v) a melt temperature ($T_m$) from 55° C., or 60° C., or 65° C. to 70° C., or 75° C., or 80° C., or 85° C.

A non-limiting example of a suitable ethylene/propylene copolymer is an ethylene-propylene copolymer having a MI of 700 g/10 min, a viscosity at 177° C. of 12,500 mPa, a density of 0.890 g/cc, a propylene content of 20% by weight, a $M_n$ of 8,000 and a $M_w$ of 18,000.

In an embodiment, the ethylene/propylene copolymer is a mixture of two or more ethylene/propylene copolymers as described herein.

In an embodiment, the ethylene/propylene copolymer or mixture of two or more ethylene/propylene copolymers is present in the filling composition in an amount of from 1 wt %, or 2 wt %, or 3 wt %, or 5 wt % to 7 wt %, or 8 wt %, or 10 wt %, or 15 wt %, or 20 wt % based on the total weight of the filling composition.

(D) Antioxidant.

The filing composition optionally includes an antioxidant.

"Antioxidant" refers to types or classes of chemical compounds that are capable of being used to minimize the oxidation that can occur during the processing of polymers. Suitable antioxidants include high molecular weight hindered phenols and multifunctional phenols such as sulfur and phosphorous-containing phenol. Representative hindered phenols include; 1,3,5-trimethyl-2,4,6-tris-(3,5-di-tert-butyl-4-hydroxybenzyl)-benzene; pentaerythrityl tetrakis-3(3,5-di-tert-butyl-4-hydroxyphenyl)-propionate; n-octadecyl-3(3,5-di-tert-butyl-4-hydroxyphenyl)-propionate; 4,4'-methylenebis(2,6-tert-butyl-phenol); 4,4'-thiobis(6-tert-butyl-o-cresol); 2,6-di-tertbutylphenol; 6-(4-hydroxyphenoxy)-2,4-bis(n-octyl-thio)-1,3,5 triazine; di-n-octylthio)ethyl 3,5-di-tert-butyl-4-hydroxy-benzoate; and sorbitol hexa[3-(3,5-di-tert-butyl-4-hydroxy-phenyl)-propionate].

A non-limiting example of a suitable antioxidant is tris (2,4-ditert-butylphenyl)phosphite, available as IRGAFOS® 168 from Ciba.

The antioxidant is present in an amount can from 0 wt %, or greater than 0 wt %, or 0.01 wt %, or 0.02 wt %, or 0.03 wt %, or 0.04 wt %, or 0.05 wt %, or 0.06 wt %, or 0.07 wt %, or 0.08 wt %, or 0.09 wt %, or 0.1 wt % to 0.12 wt %, or 0.14 wt %, or 0.16 wt %, or 0.18 wt %, or 0.2 wt %, or 0.25 wt %, or 0.3 wt %, or 0.5 wt %, or 1 wt %, or 2 wt %, based on the total weight of the filing composition.

Filling Composition

The disclosure provides a filling composition comprising (A) a mineral oil having a kinematic viscosity from 80 cSt to 100 cSt at 40° C.; (B) a styrene-ethylene/propylene diblock copolymer; (C) a propylene/ethylene copolymer having a weight average molecular weight ($M_w$) from 5,000 to 200,000, and, optionally, (D) an antioxidant (hereafter "Filling Composition 1").

In another embodiment, the disclosure provides a filling composition comprising (A) a mineral oil having a kinematic viscosity from 80 cSt to 100 cSt at 40°; (B) a styrene-ethylene/propylene diblock copolymer; and (C) an ethylene/propylene copolymer having a weight average molecular weight ($M_w$) from 5,000 to 200,000, and, optionally, (D) an antioxidant (hereafter "Filling Composition 2").

In an embodiment, Filling Composition 1 and Filling Composition 2 have a drop point from 150° C., or 180° C., or 190° C., or 195° C., or 200° C., or 220° C. to 225° C., or 250° C., or 275° C., or 300° C.

In an embodiment, Filling Composition 1 and Filling Composition 2 have a low shear rate viscosity from greater than 50 Pa·s, or 55 Pa·s, or 60 Pa·s, or 70 Pa·s, or 75 Pa·s, or 80 Pa·s to 90 Pa·s, or 100 Pa·s, or 110 Pa·s, or 120 Pa·s, or 130 Pa·s, or 140 Pa·s, or 150 Pa·s.

In an embodiment, Filling Composition 1 and Filling Composition 2 have a medium shear rate viscosity from 10 Pa·s, or 12 Pa·s, or 15 Pa·s to 18 Pa·s, or 20 Pa·s, or 25 Pa·s, or 30 Pa·s, or 35 Pa·s, or 40 Pa·s.

In an embodiment, Filling Composition 1 and Filling Composition 2 have a high shear rate viscosity from greater than 0 Pa·s, or 0.05 Pa·s, or 0.1 Pa·s, or 0.15 Pa·s, or 0.2 Pa·s, or 0.25 Pa·s to 0.3 Pa·s, or 0.35 Pa·s, or 0.4 Pa·s, or 0.5 Pa·s, or 1.0 Pa·s, or 5 Pa·s, or 10 Pa·s or 15 Pa·s, or 20 Pa·s.

In an embodiment, Filling Composition 1 and Filling Composition 2 have a shear thinning index from 8, or 10, or 20, or 50, or 100, or 150 to 200, or 300, or 400, or 500, or 1000, or 2000, or 3000, or 5000.

In an embodiment, Filling Composition 1 and Filling Composition 2 hear a low shear rate viscosity from greater than 50 Pa·s, or 55 Pa·s, or 60 Pa·s, or 70 Pa·s, or 75 Pa·s, or 80 Pa·s to 90 Pa·s, or 100 Pa·s, or 110 Pa·s, or 120 Pa·s, or 130 Pa·s, or 140 Pa·s, or 150 Pa·s and at least one of (i) a shear thinning index from 8, or 10, or 20, or 50, or 100, or 150 to 200, or 300, or 400, or 500, or 1000, or 2000, or 3000, or 5000 and (ii) a drop point from 150° C., or 180° C., or 190° C., or 195° C., or 200° C., or 220° C. to 225° C., or 250° C., or 275° C., or 300° C.

In an embodiment, Filling Composition 1 and Filling Composition 2 are homogenous blends. A homogenous blend is clear shows no separation and no undissolved particulate in the composition.

In an embodiment, Filling Composition 1 has one, some, or all of the properties:

i) a drop point from 150° C., or 180° C., or 190° C., or 195° C., or 200° C., or 220° C. to 225° C., or 250° C., or 275° C., or 300° C.; and/or ii) a low shear rate viscosity from 50 Pa·s, or 55 Pa·s, or 60 Pa·s, or 70 Pa·s, or 75 Pa·s, or 80 Pa·s to 90 Pa·s, or 100 Pa·s, or 110 Pa·s, or 120 Pa·s, or 130 Pa·s, or 140 Pa·s, or 150 Pa·s; and/or iii) a medium shear rate viscosity from 10 Pa·s, or 12 Pa·s, or 15 Pa·s to 18 Pa·s, or 20 Pa·s, or 25 Pa·s, or 30 Pa·s, or 35 Pa·s, or 40 Pa·s; and/or iv) a high shear rate viscosity from 0 Pa·s, or 0.05 Pa·s, or 0.1 Pa·s, or 0.15 Pa·s, or 0.2 Pa·s, or 0.25 Pa·s to 0.3 Pa·s, or 0.35 Pa·s, or 0.4 Pa·s, or 0.5 Pa·s, or 1.0 Pa·s, or 5 Pa·s, or 10 Pa·s or 15 Pa·s, or 20 Pa·s; and/or v) a shear thinning index from 8, or 10, or 20, or 50, or 100, or 150 to 200, or 300, or 400, or 500, or 1000, or 2000, or 3000, or 5000.

In an embodiment, Filling Composition 1 has at least two, at least three, at least four, or all five of properties i)-v). In an embodiment, Filling Composition 1 has at least property ii) and one other property selected from property i) and property v). In an embodiment, Filling Composition 1 has at least each of properties i), ii) and v). In an embodiment, Filling Composition 1 is homogenous.

In an embodiment, Filling Composition 1 has one, some, or all of the properties:

i) a drop point from 200° C. to 300° C.; and/or ii) a low shear rate viscosity from 50 Pa·s to 150 Pa·s; and/or iii) a medium shear rate viscosity from 10 Pa·s to 40 Pa·s; and/or iv) a high shear rate viscosity from greater than 0 Pa·s to 15 Pa·s; and/or v) a shear thinning index from 8 to 3000.

In an embodiment, Filling Composition 1 has at least two, at least three, at least four, or all five of properties i)-v). In an embodiment, Filling Composition 1 has property ii) and at least one other property selected from property i) and property v). In an embodiment, Filling Composition 1 has at least each of properties i), ii) and v). In an embodiment, Filling Composition 1 is homogenous.

In an embodiment, the composition comprises (A) a mineral oil having a kinematic viscosity from 80 cSt to 100 cSt at 40° C.; (B) a styrene-ethylene/propylene diblock copolymer; (C) a propylene/ethylene copolymer having a weight average molecular weight ($M_w$) from 5,000 to 200,000, and, optionally, (D) an antioxidant (Filling Composition 1). Filling Composition 1 has one, some or all of the properties:

i) a drop point from 220° C. to 250° C.; and/or ii) a low shear rate viscosity from 50 Pa·s to 140 Pa·s; and/or iii) a medium shear rate viscosity from 10 Pa·s to 40 Pa·s; and/or iv) a high shear rate viscosity from greater than 0 Pa·s to 10 Pa·s; and/or v) a shear thinning index from 150 to 3000.

In an embodiment, Filling Composition 1 has at least two, at least three, at least four, or all five of properties i)-v). In an embodiment, Filling Composition 1 has property (ii) and at least one other property selected from property i) and property v). In an embodiment, Filling Composition 1 has at least each of properties i), ii) and v). In an embodiment, Filling Composition 1 is homogenous.

Buffer Tube

The present disclosure provides a butter tube. A "buffer tube" is a conduit, contained within an optical cable through which one or more optical fibers extend. FIG. 1 provides a cross-sectional view of an exemplary buffer tube 10 which surrounds a plurality of optical fibers 15 and is filled with a filling composition 20. In an embodiment, and as shown in FIG. 1, the filling composition 20 is in contact with a surface, specifically an inner surface 12, of the buffer tube 10. The filling composition 20, or simply composition, is according to any one or combination of two or more embodiments provided herein.

The buffer tube is composed of a polymeric material. Non-limiting example of suitable polymeric materials include olefin-based polymers, such as ethylene-based polymers and propylene-based polymers, polybutylene terephthalate, and combinations thereof.

In an embodiment, the buffer tube is composed of one or more olefin-based polymers to the exclusion of polybutylene terephthalate.

In an embodiment, the buffer tube material is a propylene-based polyolefin material. The propylene-based polyolefin material comprises from 50 wt %, or 55 wt %, or 60 wt %, or 65 wt %, or 70 wt % to 75 wt %, or 80 wt %, or 85 wt %, or 90 wt %, or 95 wt %, or 100 wt % of a propylene-based polymer. The propylene-based polymer may be blended with at least one other polyolefin. Non-limiting examples of suitable polyolefins include other propylene-based polymers and ethylene-based polymers, including random propylene- and/or ethylene-based polymers and block copolymers.

In an embodiment, the buffer tube material is a blend comprising from greater than 50 wt %, or 55 wt %, or 60 wt %, or 65 wt %, or 70 wt % to 75 wt %, or 80 wt %, or 85 wt %, or 90 wt %, or 95 wt % of a propylene-based polymer and from 5 wt %, or 10 wt %, or 15 wt %, or 20 wt %, or 25 wt %, or 30 wt % to 35 wt %, or 40 wt %, or 45 wt % or less than 50 wt % of an ethylene-based polymer.

In an embodiment, the buffer tube material is an ethylene-based polyolefin material. The ethylene-based polyolefin material comprises from 50 wt %, or 55 wt %, or 60 wt %, or 65 wt %, or 70 wt % to 75 wt %, or 80 wt %, or 85 wt %, or 90 wt %, or 95 wt %, or 100 wt % of an ethylene-based polymer. The ethylene-based polymer may be blended with at least one other polyolefin. Non-limiting examples of suitable polyolefins include other ethylene-based polymers and propylene-based polymers, including random ethylene- and/or propylene-based polymers and block copolymers.

In an embodiment, the buffer tube material is a blend comprising from greater than 50 wt %, or 55 wt %, or 60 wt %, or 65 wt %, or 70 wt % to 75 wt %, or 80 wt %, or 85 wt %, or 90 wt %, or 95 wt % of an ethylene-based polymer and from 5 wt %, or 10 wt %, or 15 wt %, or 20 wt %, or 25 wt %, or 30 wt % to 35 wt %, or 40 wt %, or 45 wt % or less than 50 wt % of a propylene-based polymer.

In an embodiment, the buffer tube material is a block composite composed of (i) propylene homopolymer, (ii) an ethylene/propylene copolymer, and (iii) a block copolymer having a propylene block (PB) and an ethylene block (EB) wherein the propylene block (PB) is the same propylene homopolymer as component (i) of the block composite and the ethylene block (EB) is the same ethylene/propylene copolymer as component (ii) of the block composite.

In an embodiment, the buffer tube comprises a filling composition in contact with a surface of the buffer tube, the filling composition comprising (A) a mineral oil having a kinematic viscosity from 80 cSt to 100 cSt at 40° C.; (B) a styrene-ethylene/propylene diblock copolymer; (C) a propylene/ethylene copolymer having a weight average molecular weight ($M_w$) from 5,000 to 200,000, and, optionally (D) an antioxidant (Filling Composition 1), and the buffer tube is composed of a polyolefin material and has one, some or all of the properties:

i) an oil adsorption from 0%, or greater than 0%, or 1%, or 1.5%, or 2%, or 2.5% to 3%, or 3.5%, or 4.0%, or 4.1%, or 4.2%, or 4.3%, or 4.4%; and/or ii) a tensile stress at yield (zero slope) from 27, or 28 to 29, or 30, or 31, or 32; and/or iii) a modulus (automatic Young's) from 600 MPa, or 700 MPa, or 800 MPa to 850 MPa, or 875 MPa, or 890 mPa, or 900 MPa, or 925 MPa, or 950 MPa, or 975 MPa, or 1,000 MPa, or, 1,300 MPa, or 1,500 MPa; and/or iv) a modulus (1% secant) from 500 MPa, or 600 MPa, or 700 MPa, or 725 MPa to 750 MPa, or 775 MPa, or 800 MPa, or 825 MPa, or 850 MPa, or 875 MPa, or 900 MPa, or 925 MPa, or 950 MPa, or 975 MPa, or 1,000 MPa.

In an embodiment, the buffer tube has at least two, at least three, or all four of the properties i)-iv).

In an embodiment, the buffer tube is composed of a block composite and comprises a filling composition in contact with a surface of the buffer tube, the composition comprising A) a mineral oil having a kinematic viscosity from 80 cSt to 100 cSt at 40° C.; (B) a styrene-ethylene/propylene diblock copolymer; (C) a propylene/ethylene copolymer having a weight average molecular weight ($M_w$) from 5,000 to 200,000, and, optionally, (D) an antioxidant (Filling Composition 1) and the buffer tube has one, some, or all of the properties:

i) an oil adsorption from greater than 0% to 4.34%; and/or ii) a tensile stress at yield (zero slope) from 29 to 31; and/or iii) a modulus (automatic Young's) from 890 MPa to 1,300 MPa; and/or iv) a modulus (1% secant) from 750 MPa to 950 MPa.

In an embodiment, the buffer tube has two, three, or all four properties i)-iv).

In an embodiment, the buffer tube is composed of block composite and comprises a filling composition in contact with a surface of the buffer tube, the filling composition comprising A) a mineral oil having a kinematic viscosity from 80 cSt to 100 cSt at 40° C.; (B) a styrene-ethylene/propylene diblock copolymer; (C) a propylene/ethylene copolymer having a weight average molecular weight ($M_w$) from 5,000 to 200,000, and, optionally, (D) an antioxidant (Filling Composition 1) and the Filling Composition 1 has one, some, or all of the properties:

i) a drop point from 220° C. to 250° C.; and/or ii) a low shear rate viscosity (6 $5^{-1}$) from 50 Pa·s to 140 Pa·s; and/or iii) a medium shear rate viscosity (51 $5^{-1}$) from 10 Pa·s to 40 Pa·s; and/or iv) a high shear rate viscosity (201 $5^{-1}$) from greater than 0 Pa·s to 10 Pa·s; and/or v) a shear thinning index from 150 to 3000, wherein the buffer tube has one, some, or all of the properties:

vi) an oil adsorption from greater than 0% to 4.4%; and/or vii) a tensile stress at yield (zero slope) from 27 to 31; and/or viii) a modulus (automatic Young's) from 800 MPa to 1,500 MPa; and/or ix) a modulus (1% secant) from 700 MPa to 1,000 MPa.

In an embodiment, the composition has two, three, four or all five properties i)-v) and the buffer tube has two, three, or all four properties vi)-ix). In an embodiment, Filling Composition 1 has property ii) and at least one other property selected from property i) and property v). In an embodiment, Filling Composition 1 has at least each of properties i), ii) and v). In an embodiment, Filling Composition 1 is homogenous.

Optical Fiber Cable

An optical fiber cable includes one or more optical fibers or other optical waveguides that conduct optical signals (e.g., for carrying sound, data, video or other information). Generally, the optical fibers are arranged in a buffer tube as described herein. FIG. 1 is a cross-sectional view of an exemplary optical fiber cable 100. FIG. 1 shows a plurality of buffer tubes 10 each surrounding a plurality of optical fibers 15 and including a filling composition 20. The buffer tubes 10 are arranged around a central strength member 30 and the buffer tubes 10 and strength member 30 are encased by a water blocking tape 40 and cable jacket 50 to form the optical fiber cable 100. In the embodiment shown, the tubular structure formed by the water blocking tape 40 and cable jacket 50 is filled with filling composition 20 to provide protection against moisture and mechanical stress.

In an embodiment, an optical fiber cable includes one or more buffer tubes as described herein.

Some embodiments of the present disclosure will now be described in detail in the following examples.

Examples

Materials

15# Mineral Oil is a mineral oil having a kinematic viscosity of 15 cSt at 40° C. (available from Sinoreagent Company).

80 Mineral Oil is a mineral oil having a kinematic viscosity of 80 cSt at 40° C. (available from Suzhou Saipahan Oil Company).

100 Mineral Oil is a mineral oil having a kinematic viscosity of 100 cSt at 40° C. (available from Sinoreagent Company).

200 Mineral Oil is a mineral oil having a kinematic viscosity of 200 cSt at 40° C. (available from Shanghai Chaoya Oil Company).

G1701 is a clear linear diblock copolymer based on styrene and ethylene/propylene (S-E/P) with a bound styrene content of 35% by mass, available from Kraton Company.

PIB is poly(iso-butylene) available from INEOS as Durasyn 166.

P/E1 is a propylene/ethylene copolymer having a density of 0.885 g/cc, an ethylene content of 6 wt %, a $M_w$ of 26,914 and a $M_n$ of 11,815.

P/E2 is a propylene/ethylene copolymer having a density of 0.866 g/cc, a $M_w$ of 152,900 and a $M_n$ of 64,730, available as VERSIFY 4301 from Dow Chemical Company.

P/E3 is a propylene/ethylene copolymer having a density of 0.863 g/cc, a $M_w$ of 275,100 and a $M_n$ of 107,500, available as VERSIFY 2400 from Dow Chemical Company.

E/P is an ethylene/propylene copolymer having a density of 0.890 g/cc, a melt index of 700 g/10 min, a viscosity @ 177° C. of 12,500 mPa·s, a propylene content of 20 wt %, a $M_w$ of 18,000 and a $M_n$ of 8,000.

The material used to make the buffer tube is a block composite composed of (i) a propylene homopolymer, (ii) an ethylene/propylene copolymer, and (iii) a block copolymer having a propylene block (PB) and an ethylene block (EB) wherein the propylene block is the same propylene homopolymer as component (i) of the block composite and the ethylene block (EB) is the same ethylene/propylene copolymer of component (ii) of the block composite. The block composite comprises approximately 60 wt % of (i) the propylene homopolymer, from 30 wt % to 35 wt % of (ii) the ethylene/propylene copolymer, and from 5 wt % to 10 wt % of the block composite, based on the total weight of the blend.

Sample Preparation

Compositions of (A) mineral oil, (B) G1701, and (C) P/E1, P/E2, P/E3 or E/P are formed by putting the components (A)-(C), in accordance with the amounts provided in Table 1, into a Parr Reactor steel vessel. The vessel is installed in Parr Reactor while water pipe and pressure release valves are shut off. The mixer is started at 100-200 rpm while the heater begins to heat the vessel from room temperature to 180° C. The mixer is set to maximum speed (800 rpm) when the temperature reaches 180° C. After 2 hours of mixing at maximum speed, the heater is shut off. The vessel is released when the temperature hits 100° C. The fluid is transferred from the steel vessel to a glass bottle for performance evaluation.

TABLE 1

| | | CS0 | CS1 | CS2 | CS3 | CS4 | IE1 | IE2 | IE3 | IE4 | IE5 |
|---|---|---|---|---|---|---|---|---|---|---|---|
| Mineral Oil (wt %) | #15 | | 85 | | | | | | | | |
| | #80 | | | 85 | | | | | | 85 | |
| | #100 | | | | | 85 | 85 | 85 | 87 | | 85 |
| | #200 | | | | 85 | | | | | | |
| S-P/E Diblock Copolymer (wt %) | G1701 | | 10 | 10 | 10 | 10 | 10 | 10 | 9 | 10 | 10 |
| Poly (iso-butylene) (wt %) | PIB | | 5 | 5 | | | | | | | |
| P/E Copolymer (wt %) | P/E1 | | | | | | 5 | | 2 | 5 | |
| | P/E2 | | | | | | | | | | 5 |
| | P/E3 | | | | | 5 | | | | | |
| E/P Copolymer (wt %) | E/P | | | | | | | 5 | 2 | | |
| | Total (wt %) | | 100 | 100 | 100 | 100 | 100 | 100 | 100 | 100 | 100 |
| Compatibility with Buffer Tube Material (BT-1) | Oil Adsorption (%) | 0** | 9.42 | 4.42 | * | * | 3.69 | 4.03 | 3.64 | 2.96 | 4.29 |
| | Tensile Stress at Yield (Zero Slope) (MPa) | 30 | 26 | 29 | * | * | 29 | 29 | 29 | 30 | 29 |
| | Automatic Young's Modulus (MPa) | 1612 | 524 | 879 | * | * | 896 | 929 | 931 | 1215 | 998 |
| | 1% Secant Modulus (MPa) | 1249 | 492 | 726 | * | * | 766 | 769 | 794 | 939 | 818 |
| Shear Viscosity (Pa·s) | Low Shear Rate (6 s$^{-1}$) | | 12.2 | 21.0 | * | * | 130.3 | 56.0 | 57.0 | 90.5 | 122.0 |
| | Medium Shear Rate (51 s$^{-1}$) | | 3.8 | 6.7 | * | * | 15.5 | 11.4 | 10.7 | 26.1 | 36.5 |
| | High Shear Rate (201 s$^{-1}$) | | 1.8 | 0.4 | * | * | 0.1 | 0.1 | 0.4 | 11.3 | 8.7 |
| | Shear Thinning Index | | 6.7 | 55.9 | * | * | 2385.1 | 491.7 | 153.0 | 8.0 | 14.0 |
| | Drop Point | | 149.6 | 218.1 | * | * | 223.6 | 231.1 | 199.3 | 221.1 | 198.2 |

*the mixtures of CS3 and CS4 are inhomogeneous and the sample were not tested
**CS0 tests the material with no exposure to a filling composition
CS = comparative sample
IE = inventive example CS1, CS2 and IE1-IE5 show no separation and the mixture appeared homogenous to the unaided eye. CS3 uses a mineral oil having a kinematic viscosity of 200 cSt (greater than 80 cSt to 100 cSt). CS4 uses a propylene/ethylene copolymer with a $M_w$ of 275,100 (greater than 200,000). Both CS3 and CS4 are inhomogeneous with visible separation and/or particulate in the fluid. CS3 and CS4 are not tested because the propylene/ethylene copolymer cannot dissolve into the oil and the properties of the filling compositions of CS3 and CS4 therefore cannot be determined.

The CS0 is a comparative sample which shows the mechanical properties of the buffer tube material without exposure to any filling composition. While the mechanical properties of the buffer tube material generally worsened upon absorption of the oil from the filling compositions of CS1-CS2 and IE1-IE5, the mechanical properties of the buffer tubes of IE1-IE5, which each use a filling composition of the present disclosure, each have improved mechanical properties compared to CS1 and CS2.

Specifically, a comparison of CS1 to CS2 and IE1-IE5 shows that using a mineral oil with a viscosity less than 80 cSt results in increased oil adsorption by the buffer tube material (2. 9.42% for CS1 compared to 96-4.42% for CS2 and IE1-IE5). As a result, CS2 and IE1-IE5 show significantly improved mechanical properties after exposure to the oil. CS2 and IE1-IE5 each has an automatic Yong's modulus of 600 MPa to 1,500 MPa (compared to CS1 having an automatic Young's modulus of 1612 MPa) and a 1% secant modulus from 500 MPa to 1,000 MPa (compared to CS1 having a 1% secant modulus of 1,249 MPa), while maintaining a tensile stress at yield from 27-32 MPa.

Despite CS2's mechanical performance, CS2, which uses a mineral oil having a viscosity of 15 cSt (less than 80 cSt) does not having the combination of improved shear thinning performance (i.e., shear thinning index from 8 to 3,000) and improved low shear rate viscosity (i.e., low shear rate viscosity from 50 Pa·s to 150 Pa·s). A comparison of CS2 to IE1-IE5 shows that that using a mineral oil with a viscosity of 80 cSt to 100 cSt in combination with an propylene/ethylene copolymer or ethylene/propylene copolymer having a $M_w$ of 5,000 to 200,000 results in a fluid having the combination of improved shear thinning performance (i.e., shear thinning index from 8 to 3,000) and improved low shear rate viscosity (i.e., low shear rate viscosity from 50 Pa·s to 150 Pa·s). E1-IE5 each has a shear thinning index from 8 to 3000 and a low shear rate viscosity from 50 Pa·s to 150 Pa·s, while CS2 has a shear thinning index of 55.9 but a low shear rate viscosity of only 21.0 Pa·s. A higher low shear rate viscosity indicates the composition is more fluid (i.e., flows more readily when not under shear forces) and can be pumped.

Further, a comparison of CS1 and CS2 to IE1-IE5 shows that the compositions containing a mineral oil with a viscosity less than 80 cSt, a styrene-ethylene/propylene diblock copolymer and an propylene/ethylene copolymer or ethylene/propylene copolymer having a Mw of 5,000 to 200,000 have higher (better) drop points (from 150° C. to 300° C.) in combination with low shear rate viscosity from 50 Pa·s to 150 Pa·s. Again, while CS2 has a drop point of 218.1° C., CS2 has a low shear rate viscosity of only 21.0 Pa·s. CS2, with a drop point of 218.1° C. and a low shear rate viscosity of 21.0 Pa·s, does not have the combination of drop point and low shear rate viscosity performance, i.e., a drop point from 150° C. to 300° C. and a low shear rate viscosity from 50 Pa·s to 150 Pa·s.

In sum, as compared to CS1-CS4, the inventive examples IE1-IE5 had better performance with respect to solubility of the styrene-ethylene/propylene diblock copolymer, oil adsorption, mechanical properties, shear thinning and drop point.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A filling composition comprising:
   (A) from 70 wt % to 90 wt. % of a mineral oil having a kinematic viscosity from 80 cSt to 100 cSt at 40° C.;
   (B) from 5 wt % to 15 wt % of a styrene-ethylene/propylene diblock copolymer; and
   (C) from 1 wt % to 20 wt % of a propylene/ethylene copolymer having a weight average molecular weight (Mw) from 10,000 to 50,000, wherein the filling composition has a drop point from 200° C. to 300° C.

2. The filling composition of claim 1 having a shear viscosity at 6 s$^{-1}$ from 50 Pa·s to 150 Pa·s at 25° C.

3. The filling composition of claim 2 having a shear thinning index from 8 to 3000 at 25° C.

4. A buffer tube comprising:
   the filling composition of claim 1 in contact with a surface of the buffer tube.

5. The buffer tube of claim 4 having a 1% secant modulus from 700 MPa to 1,000 MPa as measured according to ASTM D638.

6. The buffer tube of claim 5 having an automatic Young's modulus from 800 MPa to 1,500 MPa as measured according to ASTM D638.

7. The buffer tube of claim 6 having a tensile stress at yield from 27 to 31 MPa as measured according to ASTM D638.

8. A filling composition comprising:
   (A) 70 wt % to 90 wt % of a mineral oil having a kinematic viscosity from 80 cSt to 100 cSt at 40° C.;
   (B) 5 wt % to 15 wt % of a styrene-ethylene/propylene diblock copolymer; and
   (C) 1 wt % to 20 wt % of an ethylene/propylene copolymer having a weight average molecular weight (Mw) from 10,000 to 30,000, wherein the filling composition has a drop point from 200° C.

9. A buffer tube comprising:
   the filling composition of claim 8 in contact with a surface of the buffer tube.

* * * * *